United States Patent [19]

Brooks

[11] 3,914,686

[45] Oct. 21, 1975

[54] WELL LOGGING APPARATUS INCLUDING A RELEASABLE EXTENDIBLE SPRING MEMBER HAVING A WELLBORE WALL ENGAGING CONTACT

[75] Inventor: Robert A. Brooks, Ponca City, Okla.

[73] Assignee: Continental Oil Company, Ponca City, Okla.

[22] Filed: Mar. 25, 1974

[21] Appl. No.: 454,041

Related U.S. Application Data

[63] Continuation-in-part of Ser. No. 374,705, June 28, 1972, abandoned.

[52] U.S. Cl. ................................................. 324/10
[51] Int. Cl.² ......................................... G01V 3/18
[58] Field of Search .......... 324/1, 10; 166/170, 172, 166/173, 174; 73/151, 152

[56] References Cited
UNITED STATES PATENTS

| | | | |
|---|---|---|---|
| 2,157,493 | 5/1939 | Miller et al. .......................... | 166/174 |
| 2,281,960 | 5/1942 | Vacquier .............................. | 73/152 |
| 2,564,861 | 8/1951 | Sherborne ........................... | 324/10 X |
| 2,588,717 | 3/1952 | Goodwin ............................ | 324/10 UX |
| 2,632,795 | 3/1953 | Boucher .............................. | 324/10 X |
| 2,826,736 | 3/1958 | Doll .................................... | 324/10 X |
| 2,899,633 | 8/1959 | Smith et al. .......................... | 324/10 |
| 3,377,550 | 4/1968 | Osoba et al. .......................... | 324/10 |
| 3,454,870 | 7/1969 | Lintelman et al. ..................... | 324/10 |

Primary Examiner—Gerard R. Strecker
Attorney, Agent, or Firm—F. Lindsey Scott

[57] ABSTRACT

A well logging apparatus for determining electrical and electrochemical properties of subterranean formations penetrated by a well bore is provided; said apparatus comprising a support member, a releasable, extendible spring member mounted thereon, and an electrically conductive contact means positioned on the spring member so that the voltage differential between the well wall and a reference potential may be determined.

7 Claims, 4 Drawing Figures

WELL LOGGING APPARATUS INCLUDING A RELEASABLE EXTENDIBLE SPRING MEMBER HAVING A WELLBORE WALL ENGAGING CONTACT

BACKGROUND OF THE INVENTION

This application is a continuation-in-part of my earlier filed application, U.S. Ser. No. 374,705 of the same title, filed June 28, 1972, now abandoned.

FIELD OF THE INVENTION

This invention relates to apparatus for logging well bores. This invention further relates to apparatus for determining electrical and electrochemical properties of subterranean formations penetrated by well bores.

BRIEF DESCRIPTION OF THE PRIOR ART

In oil, gas and mineral well drilling and production, it is desirable to be able to determine the characteristics of the various strata or geological formations penetrated by a well bore without having to take core samples at various positions in the well. Electrical well logging has been used to accomplish this objective. The methods used have required that certain electrical properties of the earth be measured at various levels in the well by lowering electrode assemblies down the well and recording the potential differences between two electrodes at various levels in the well and the like. Such methods have the disadvantage that the well bore and walls are often coated with mud and the like and complex equipment is required for the compilation of the multiple data points required.

In light of the desirable results achievable by electrical well logging, a continuing effort has been directed to methods for direct logging of the entire well wall quantitatively.

OBJECTS OF THE INVENTION

It is an object of the present invention to provide a well logging apparatus which allows the quantitative determination of electrical and electrochemical properties over substantially the entire length of the well bore. It is a further objective of the present invention to provide a simple and reliable well logging apparatus for determining electrical and electrochemical properties of subterranean formations.

SUMMARY OF THE INVENTION

It has now been found that the objectives of the present invention are accomplished in a well logging apparatus for determining electrical and electrochemical properties of subterranean formations penetrated by a well bore comprising a support member adapted to be lowered into a well; a releasable, extendible spring member mounted on the support member; an electrically conductive contact means positioned on the extendible member so that the contact means is urged against the well wall when the spring member is in an extended position; means for sensing the voltage differential between the well wall in contact with the contact means and a reference potential and means for raising and lowering the support member in the well.

DESCRIPTION OF PREFERRED EMBODIMENTS

Figure 1:
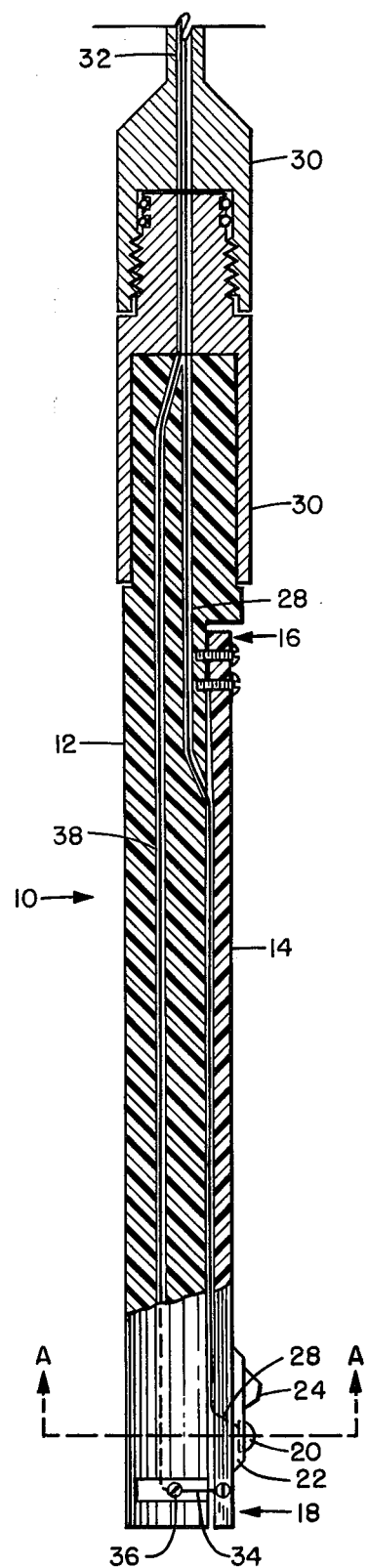
FIG. 1 shows an embodiment of the apparatus of the present invention.

FIG. 1 shows a preferred embodiment of the well logging apparatus 10 of the present invention. The apparatus consists of a support member 12, which has attached thereto a releasable, extendible spring member 14 having a first end 16 and a second end 18. The spring member 14 is connected to the support member at its first end 16. An electrically conductive contact means 20 is positioned near the second end 18 of the spring member. The contact means 20 is positioned near the second end of the spring member on a contact support means 22, as shown, so that the contact means is raised somewhat from the spring member. The contact support means may and desirably does include a scraper means 24 so that when the spring member is in an extended position against a well bore wall, the scraper removes mud, debris, and the like from the wall of the well ahead of the electrically conductive contact. The support member is equipped with coupling means 30 so that it may be conveniently connected to a cable 32 and thus positioned at variable locations in the well bore. The contact means is electrically connected to a means for determining the potential difference between the portion of the well wall in contact with the contact means and a known ground potential by an electrical conductor 28.

The spring member is retained in an unextended position by a wire 34, which holds it next to the support member. When it is desired to release the spring member so that it may move to an extended position, an electrical current is passed through the wire, which is constructed of a material which has a high resistance to electrical current, so that the wire is heated and breaks. The wire is connected to a power source at the surface by electrical contacts 36 and electrical conductors 38.

Figure 2:
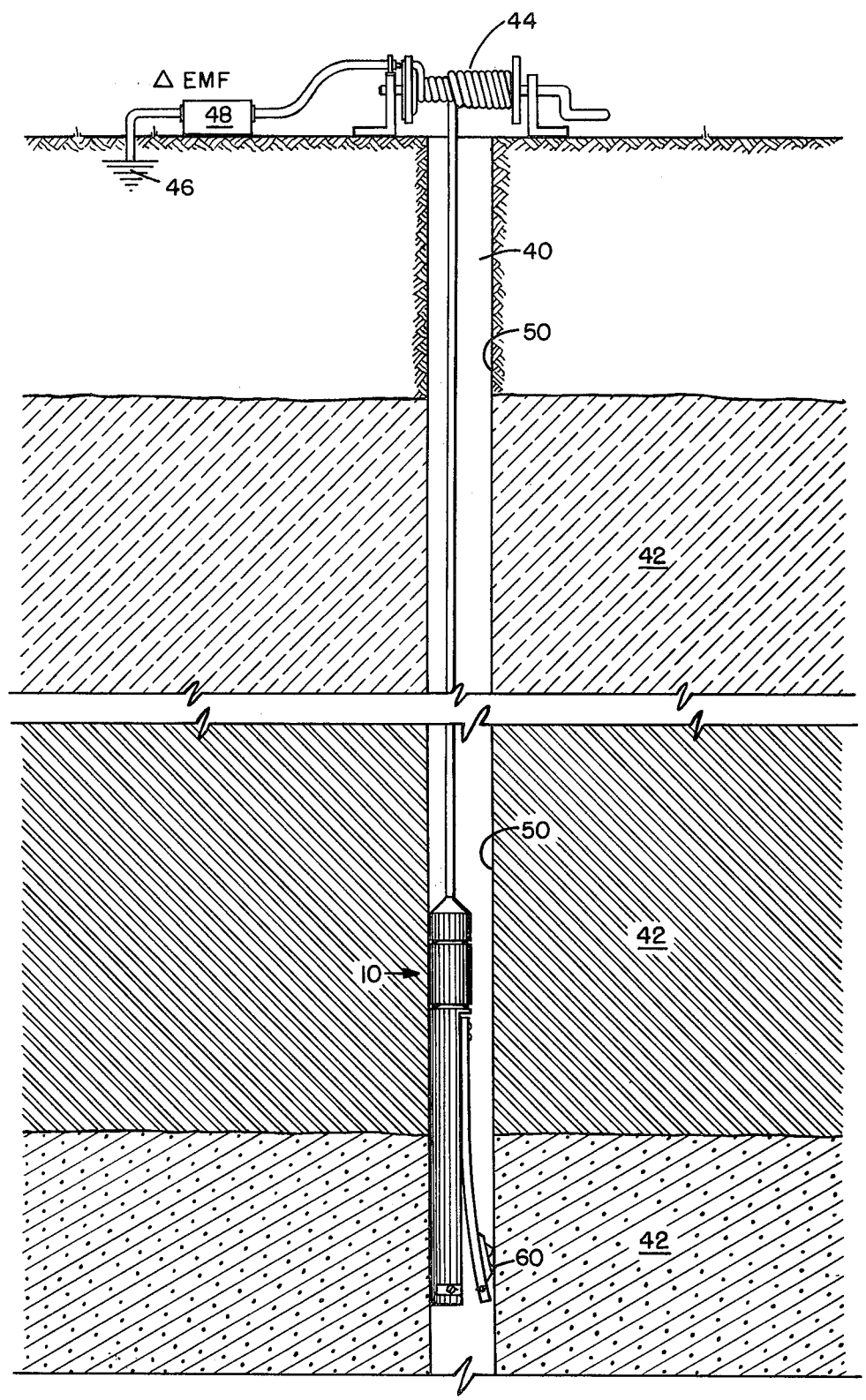
FIG. 2 shows the apparatus of FIG. 1 in position in a well bore.

FIG. 2 discloses the well logging apparatus 10 of FIG. 1 in position in a well bore with the spring member in an extended position so that the contact means is in contact with the well wall 50. The well 40 penetrates various subterranean formations 42. A spool means 44 for raising and lowering the well logging apparatus in the well bore is shown. In the embodiment shown, a ground 46 is used for comparison to the potential of the portion of the well wall in contact with the contact means 60 and the potential difference is measured by a means for determining potential difference 48 located at the surface.

Figure 3:
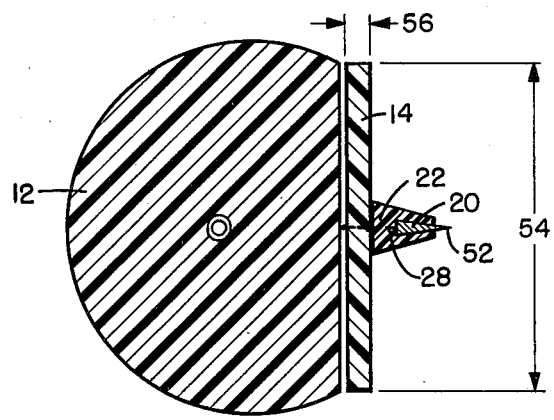
FIG. 3 is a cross section of the apparatus of FIG. 1 at line A—A.

FIG. 3 shows a cross sectional view of the apparatus of FIG. 1 taken at line A—A. The spring member is shown in an unextended position with the contact means mounted on the contact support means as shown in FIG. 1. The contact means includes a sharpened portion 52 so that when the spring member is in an extended position as in FIG. 2 the contact means is strongly urged against the well wall and penetrates the well wall. The spring member is an arcuate spring having a strength adequate to strongly urge the contact means against the well wall when in the extended position. In a preferred embodiment the spring member has a width 54 of at least twice its thickness 56 and preferably at least 4 times its thickness.

Figure 4:
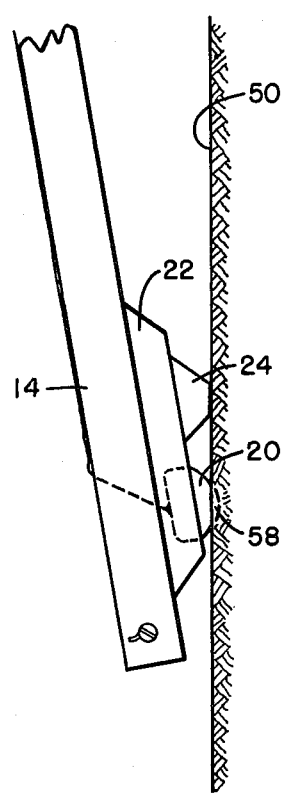
FIG. 4 is a sectional view of the apparatus of FIG. 1 in a well bore more particularly showing the contact means in contact with the well wall.

FIG. 4 shows the contact means in contact with the well wall 50 as shown in FIG. 2. The contact means is strongly urged into contact with the well wall by the spring member and has penetrated the well wall as shown.

In the operation of the apparatus of the present invention, the apparatus would normally be lowered into a well in the unextended position, and upon reaching a selected location in the well, electrical current is passed through the retaining wire 34, thereby releasing the spring means so that the contact means comes into contact with and penetrates a portion of the well wall. The apparatus is then raised at a controlled rate so that a chart reading of the voltage differential between the freshly exposed well wall surfaces and a reference potential is obtained. A convenient reference potential is a calomel electrode or a porous pot which is placed on or in the ground adjacent the well and connected to a differential voltage recorder in a manner well known to those skilled in the art.

As will be obvious, a chart recording of the differential voltage as a function of the position in the well may readily be obtained by coupling with the apparatus of the present invention a position recorder so that the position of the apparatus in the well is readily determined and plotted together with the differential voltage.

The properties normally determined by the electrical logging are Eh, and the spontaneous potential of the formations. These determinations are readily derived from the differential voltage measurement achieved by the apparatus of the present invention.

As will be obvious to those skilled in the art, the apparatus must be constructed of electrically non-conductive material, with the exception of the electrically conductive contact and the various electrical conductors, unless steps are taken to insulate the exterior portion of the apparatus. The support member may be formulated from metal, plastics and the like so long as a non-conductive exterior is provided. The spring member is desirably formulated from resilient plastics, metals and the like so long as the exterior surfaces are rendered non-conductive. The contact means is fabricated from an abrasion-resistant metallic material, such as platinum and platinum alloys. The contact must be highly conductive and, in addition, must be resistant to abrasion and wear since in a preferred embodiment, it is dragged up the side of the well. The contact should also be inert to the chemical environment at the well wall. As noted hereinbefore, in a preferred embodiment, the electrical contact is forced against the side of the well bore so that it actually penetrates the material comprising the subterranean formations thus the potential is measured with respect to freshly exposed wall surfaces. It is preferable that the contact means be sharpened in order that the penetration of the well wall is more readily achieved. Of course, the apparatus may be raised and lowered by any of a variety of methods well known to those skilled in the art. It is not believed that such well-known methods require further discussion, since the particular method for raising and lowering the support member forms no part of the present invention except in combination with the apparatus described hereinbefore.

Similarly, means for measuring the differential voltage are well known to those skilled in the art, and any such means is acceptable so long as the voltage differential is accurately recorded.

The spring member may be retained in position by any convenient method. Many variations and modifications in the method for retaining the spring member in a desired position will be obvious to those skilled in the art. Any such method which is effective in retaining the spring member in a desired position is suitable in the practice of the present invention.

In the embodiment shown, it is desirable that the wire be formulated from a material which has a high tensile strength so that the spring member may be retained in an unextended position during lowering. The wire should also have a high resistivity so that upon the passage of an electrical current through the wire, it is heated and melted, thus releasing the spring member. Any material which has suitable tensile strength and high resistivity will be found effective. Many such materials are known to those skilled in the art, and it has been found that desirable results are obtained when a Nichrome wire was used.

While the apparatus of the present invention is effective without the contact support means positioning the contact means on the extended member, it has been found that a desirable embodiment of the present invention utilizes a contact support means which supports the contact means. The contact support means is desirably formed to act as a scraper to remove mud, debris, and the like from the well wall as it passes along the well wall ahead of the contact means.

In a preferred embodiment of the present invention, depth measuring means are used in conjunction with the apparatus to provide a plot of the differential voltage as a function of the depth in the well, thus allowing the compilation of the differential voltage as a function of the particular location in the well. Such information is of great value in defining and locating the individual subterranean formations through which the wall passes.

Many variations and modifications are, of course, possible within the scope of the present invention, and it is expected that many such variations or modifications may appear obvious or desirable to those skilled in the art in light of the foregoing description of preferred embodiments.

Having thus described the invention, I claim:

1. A well logging apparatus for determining electrical and electrochemical properties of subterranean formations penetrated by a wellbore over substantially the entire length of the wellbore above a selected location, said apparatus comprising;
   a. a support member adapted to be lowered into a well;
   b. a releasable extendible arcuate spring member, having a first and a second end, said first end being connected to said support member;
   c. a sharpened electrically conductive contact means positioned on said spring member near said second end of said spring member so that said electrically conductive contact means is strongly and substantially continuously urged against the well wall by said spring member when said spring member is in an extended position so that said contact means penetrates said well wall and contacts freshly exposed well wall surfaces;
   d. means connected to said contact means for sensing the voltage differential between the portion of said well wall in contact with said contact means and a reference potential; and e. means for raising and lowering said support member in said well said contact being maintained in substantially continuous contact with said well wall while said support member is raised in said well.

2. The apparatus of claim 1 wherein said contact means is positioned on a contact support means positioned on said spring member near said second end of said spring member.

3. The apparatus of claim 2 wherein said contact support means includes a scraper means to scrape said well wall ahead of said contact means when said support member is moved upwardly in the well.

4. The apparatus of claim 1 wherein said contact means is platinum or a platinum alloy.

5. The apparatus of claim 1 wherein said apparatus includes means for releasably retaining said spring member in an unextended position.

6. The apparatus of claim 5 wherein said means for releasably retaining said spring member comprises an electrically resistive wire means connecting said support member and said spring member so that said spring member is retained in an unextended position.

7. The apparatus of claim 6 wherein said spring member is released by passing current through said wire means so that said wire means is heated and parts, thereby releasing said spring member.

* * * * *